(12) United States Patent
Devi

(10) Patent No.: US 9,122,888 B2
(45) Date of Patent: Sep. 1, 2015

(54) SYSTEM AND METHOD TO CREATE RESILIENT SITE MASTER-KEY FOR AUTOMATED ACCESS

(71) Applicant: Dell Products, LP, Round Rock, TX (US)

(72) Inventor: Yogesh M. Devi, Bangalore (IN)

(73) Assignee: Dell Products, LP, Round Rock, TX (US)

( * ) Notice: Subject to any disclaimer, the term of this patent is extended or adjusted under 35 U.S.C. 154(b) by 120 days.

(21) Appl. No.: 13/947,352

(22) Filed: Jul. 22, 2013

(65) Prior Publication Data

US 2015/0026461 A1    Jan. 22, 2015

(51) Int. Cl.
*G06F 21/62* (2013.01)
*G06F 21/60* (2013.01)

(52) U.S. Cl.
CPC .......... *G06F 21/6245* (2013.01); *G06F 21/606* (2013.01)

(58) Field of Classification Search
CPC ...................................................... G06F 21/62
See application file for complete search history.

(56) References Cited

U.S. PATENT DOCUMENTS

| 7,764,795 B2 | 7/2010 | Philips |
| 8,225,095 B2 | 7/2012 | Funk |
| 8,316,237 B1* | 11/2012 | Felsher et al. ................. 713/171 |
| 8,448,719 B2* | 5/2013 | Furukawa ....................... 173/171 |
| 8,464,058 B1* | 6/2013 | Chen et al. ..................... 713/171 |
| 2003/0204724 A1 | 10/2003 | Ayyagari et al. |
| 2011/0145579 A1 | 6/2011 | Shin et al. |
| 2012/0072723 A1* | 3/2012 | Orsini et al. .................. 713/165 |

* cited by examiner

*Primary Examiner* — Brandon Hoffman
*Assistant Examiner* — Wasika Nipa
(74) *Attorney, Agent, or Firm* — Larson Newman, LLP

(57) ABSTRACT

A system encrypts a private key with a master key and includes a storage device for storing a protected private key at a site location, a processor that determines a plurality of derivatives by selecting an order of site characteristics from a plurality of disjoint sets of site characteristics unique to a software installation or site location, wherein the processor applies a hash algorithm to each site characteristic. The system further includes a buffer storage device for storing an order of random selections of the site characteristics for the derivatives. The system encrypts the master key with the derivatives and additionally stores the encrypted form of the master key in a storage device.

20 Claims, 8 Drawing Sheets

SYSTEM AND METHOD TO CREATE RESILIENT SITE MASTER-KEY FOR AUTOMATED ACCESS

FIELD OF THE DISCLOSURE

This disclosure generally relates to information handling systems, and more particularly relates creating a resilient master-key for secure site access by automated systems.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as clinical healthcare data storage and distribution, financial transaction processing, procurement, stocking and delivery tracking, provision of data services and software, airline reservations, enterprise data storage, or global communications. In addition, information handling systems may include a variety of hardware and software components that may be configured to process, store, and communicate information and may include one or more computer systems, data storage systems, and networking systems. Today, most business enterprises have sophisticated computing systems that are used both for internal operations, and for communicating outside the enterprise's network. Certain data, such as healthcare related information or financial information, may be extremely sensitive data requiring heightened protection. Encryption and protection of physical storage sites holding such data may provide a measure of protection but create substantial difficulty in access and distribution of such data to authorized users.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other teachings may be utilized in this application, as well as in other applications and with several different types of architectures such as distributed computing architectures, client or server architectures, or middleware server architectures and associated components.

Most businesses and other enterprises have sophisticated computing systems used for facilitating internal operations and for storing sensitive data, protecting access to such data, and securely communicating outside the enterprise's network, for example to exchange information with business partners, healthcare providers or the similar data exchange partners. Much of present day information exchange is conducted electronically, via communications networks, both internally to the enterprise, and among enterprises. Accordingly, it is often necessary to store information or exchange information or data securely to protect the data from theft. For example, protected health information (PHI) must be carefully protected under Health Insurance Portability and Accountability Act (HIPAA) and the privacy of PHI must be maintained. Disclosures must be accounted for. Additionally, limitations must be placed on transmission of sensitive PHI to protect the privacy, among other things. Thus, storage of PHI must comply with technical safeguards including use of encryption techniques to prevent intrusion in open networks, or optional encryption in closed networks. Similarly, electronic exchange of PHI between distinctly different computing systems, computer networks, software applications, etc. must also comply with technical protection requirements including technical safeguards for preventing interception and unauthorized use of transmission. Accessing entity authentication techniques may be used such as passwords, token systems or the like. Data protection may include encryption techniques, checksum usage, data corroboration, message authentication, and digital signatures to protect and enable communications between diverse systems or networks or applications in connection with the conducting of data exchange, including for example healthcare data exchange. In the case of healthcare related data, strict limitations may be placed on transmitting the sensitive data from a site location. These strict limitations may be submitted in cleartext, as opposed to encrypted text, to ensure the limitations are followed.

Figure 1:
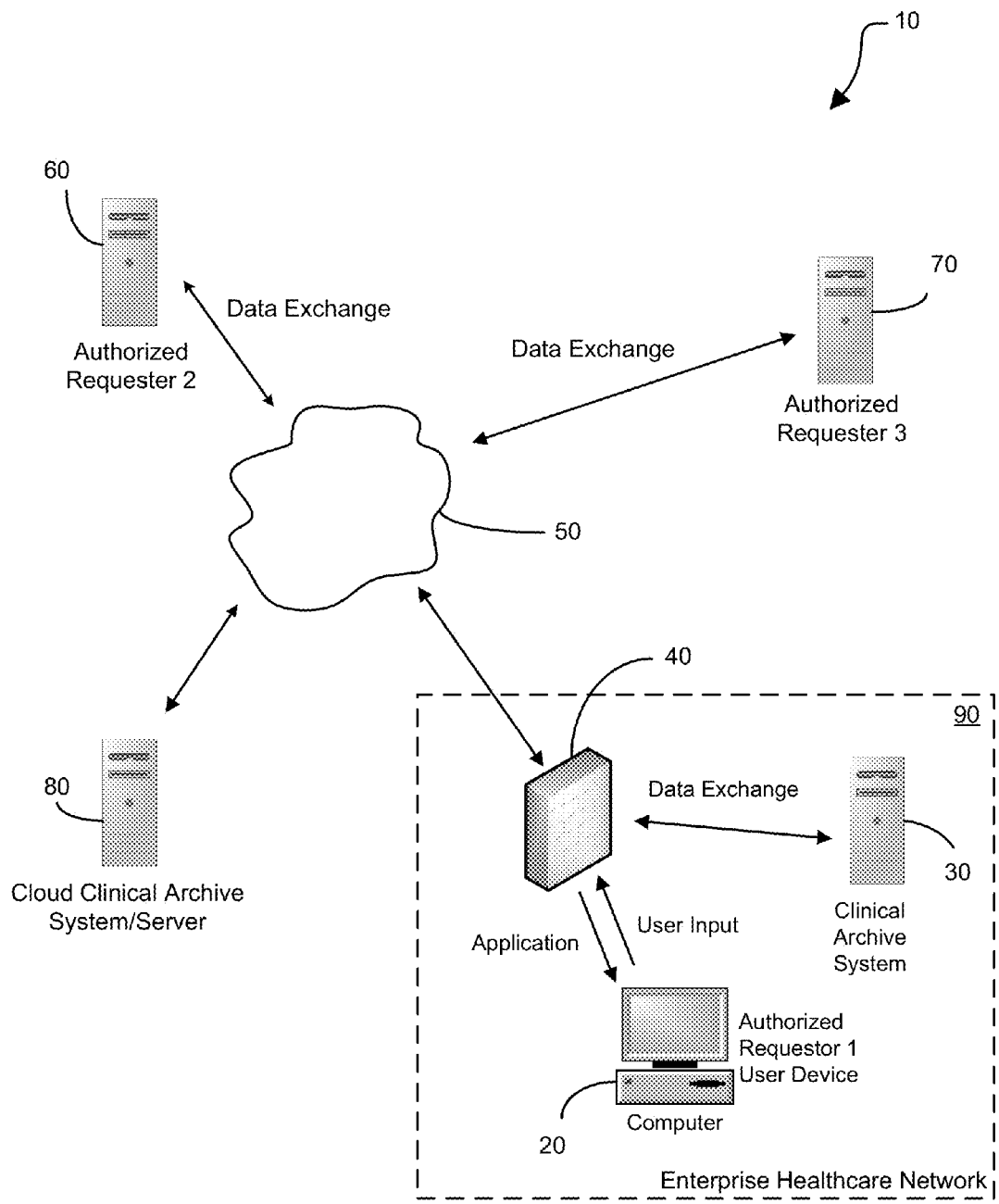
FIG. 1 is a block diagram illustrating a healthcare information access network system according to an embodiment of the present disclosure.

FIG. 1 shows a distributed information network system 10 including conventional information handling systems of a type typically found in client/server computing environments. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network server or storage device, a switch router, wireless router, or other network communication device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communications between the various hardware components.

More specifically, the system 10 includes a conventional user/client device 20, such as a personal computer, enabling a user to communicate via a communications network 50, such as the Internet. The exemplary user device 20 may be configured with conventional web browser software. The web browser, such as Microsoft Corporation's Internet Explorer web browser software, allows the user to interact with secured websites via the network 50.

The client clinical device 20 is positioned within an enterprise network 90, such as an enterprise healthcare network, behind an enterprise network's firewall 40. Client clinical device 20 may be an authorized requestor device behind the enterprise firewall. For illustrative purposes, the enterprise healthcare network 90 includes a clinical archive system 30, which may include conventional computer hardware and commercially available clinical healthcare data entry and archive systems such as the Dell Cloud Clinical Archive (DCCA). In an example embodiment, the DCCA 30 may be managed by an Intelligent Management Gateway (IMG) installed on top of an enterprise grade linux installation at the enterprise healthcare network 90.

The system 10 further includes authorized requestor systems 60 and 70 as client clinical devices outside the enterprise healthcare network 90 for receiving and/or transmitting data relating to sensitive healthcare information. For example, a physician's office may operate authorized requestor system 60 to allow for transmitting medical records and images to be stored in clinical archives at a healthcare enterprise 90, for example a hospital, and to receive medical records and images from clinical archives of a healthcare enterprise 90 in electronic data form as part of electronic data exchange processes. In an example embodiment, the IMG software may connect to client clinical devices 60 or 70 of authorized requestors via health informatics standards such as set forth in ISO standard 12052:2006 "Health informatics—Digital imaging and communication in medicine (DICOM) including workflow and data management" or ANSI Health Level 7 (HL7) for transmitting data or receiving data from a clinical archive system 30 data center. In an embodiment, the site specific characteristics of the physical sites of the clinical archive 30 or the authorized requestors 20, 60, and 70 are used with one or more layers of encryptions to protect the PHI. These site locations include several site specific characteristics relating to the hardware located there, virtual location identification information, or characteristics unique to the installation of software at a site location. Many, if not most, of the site specific characteristics can only be known by someone with physical or virtual access to the system storing the PHI or requesting the PHI. Random selection of a plurality of the site specific characteristics provides a useful algorithm and tools for protecting a resilient, site specific master encryption key. The site specific master key is generated in one embodiment and protected using one or more derivatives generated from the selected site specific characteristics. This site specific master key may be used to protect one or more other encryption keys. In an example embodiment, a layered encryption system may be set up whereby the site specific master key is used to encrypt a private key at a location which, in turn, is used to encrypt a symmetric key. Upon discarding the original site specific master key, a layered encryption system is set up to protect the stored PHI or transmitted PHI. In the example embodiment, the symmetric key would encrypt or decrypt the protected PHI.

Finally, the system 10 includes a server 80 that may represent a secured cloud clinical archive system used by the healthcare enterprise. In one embodiment, the cloud clinical archive server 80 is subject to strict limitations on accessibility of PHI and limitations on transmission. The site specific characteristics of the cloud clinical archive 80 may be used just as they are used by the clinical archive 30 or authorized requestor systems 20, 60, and 70 may be used to secure the site specific master key and, thus, secure the PHI information.

FIGS. 1-5 illustrate a system and method for creating a resilient, site specific master key to be used with one or more encryption algorithms to protect PHI stored at a sensitive data archive such as a clinical health information archive. The resilient, site specific master key may also be used with one or more encryption algorithms to protect PHI during secure transmission between authorized requestor systems 20, 60, 70 and a clinical archive 80, 90 within the network 10 depicted in FIG. 1.

Figure 2:
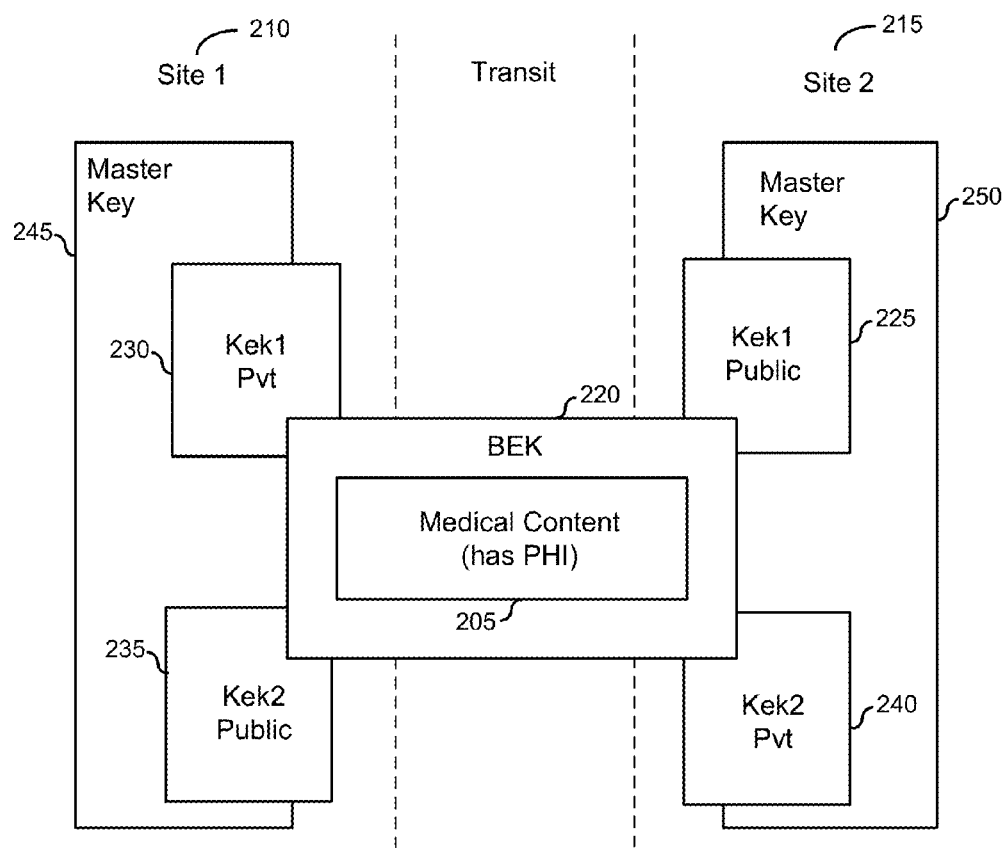
FIG. 2 illustrates a visual model of the role that various keys play in protection of other keys or the end customer data during encryption of sensitive information transmission according to an embodiment of the present disclosure.

The system and method to generate a resilient, site specific master key may be used with one or more encryption algorithms to protect PHI or similarly sensitive data. In an exemplary embodiment, a layered method of encryption may be used to protect PHI or other sensitive information. FIG. 2 shows such a layered encryption method in use for bi-directional transmission of sensitive information 205 between a first physical site 210 and a second physical site 215. The sensitive information 205 may include medical content and having PHI. The encryption layers include a two-way symmetrical encryption, a public/private encryption, and a master key. A symmetrical key 220, sometimes called a bulk encryption key (BEK), is used to encrypt the sensitive information 205. The symmetrical key 220 may be a suitable symmetric key including stream or block ciphers. Example suitable symmetric key algorithms may include the Advanced Encryption Standard (AES) cipher, Twofish symmetric key block cipher, Serpent symmetric key block cipher, Blowfish symmetric key block cipher, CASTS symmetric key block cipher, RC4 stream cipher, Triple Data Encryption Algorithm (3DES) block cipher, International Data Encryption Algorithm (IDEA) symmetric key block cipher or other similar symmetric key algorithms.

The public-key encryption layer is the next layer shown in FIG. 2. It includes asymmetric encryption algorithms for secure transmission in either direction. A public key 225 (public KEK1) is stored at second physical site 215 and a private key 230 (pvt KEK1) is stored at a first physical site 210 for use in a public/private encryption pairing to encrypt transmission of the symmetrical key 220 from a second site 215 to an authorized requestor or system at a first site 210. Similarly, public key 235 (public KEK2) is stored at first physical site 215 and a private key 240 (pvt KEK2) is stored at a second physical site 210 for use in a public/private encryption pairing to encrypt transmission of the symmetrical key 220 from first site 210 to an authorized requestor or system at second site 215. This may be accomplished via techniques such as the Diffie-Hellman key exchange protocol, password-authenticated key agreements, ElGamal asymmetric encryption algorithm, RSA public-key encryption, or similar asymmetric encryption algorithms.

The third layer of encryption shown in FIG. 2 is site-specific master keying. The first site has a master encryption key 245 (MK1) for encrypting the private key 230. The second site has its own master encryption key 250 (MK2) for encrypting private key 240. Additional detail of the site-specific master key algorithms and the symmetric and asymmetric encryption algorithms are described further below.

Figure 3:
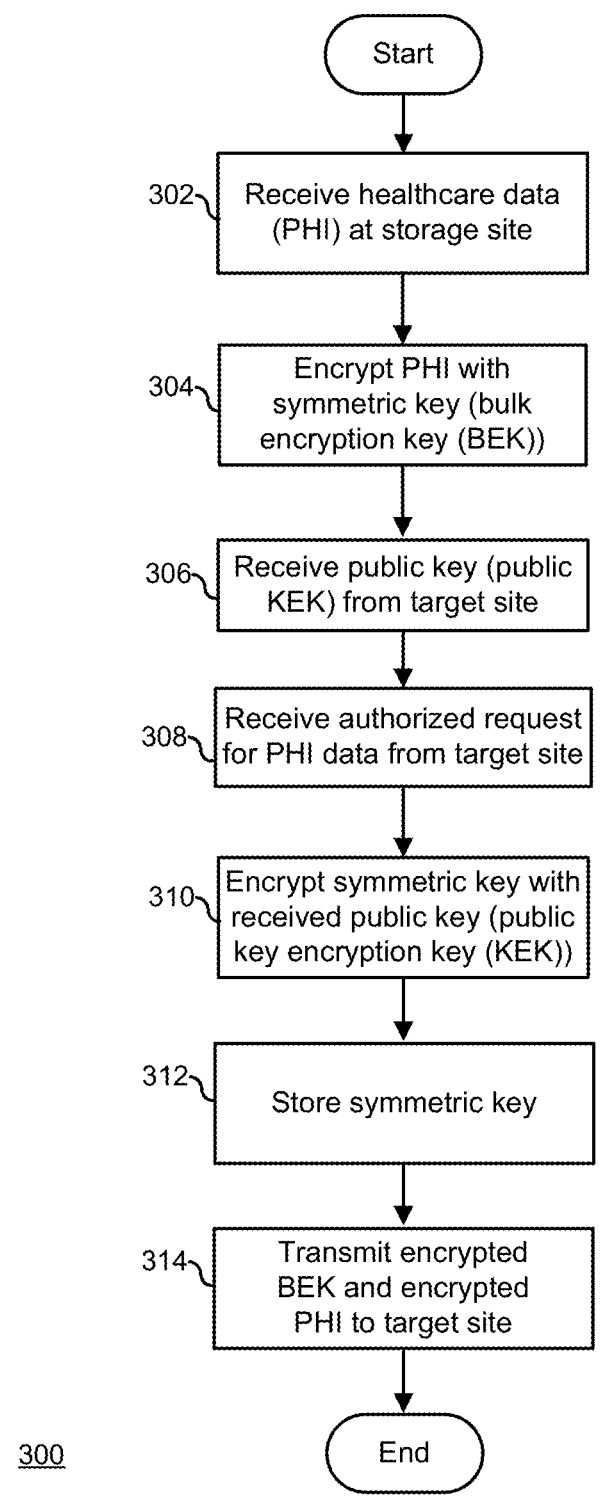
FIG. 3 illustrates a flow diagram of an example encryption and transmission process according to an embodiment of the present disclosure.

The layers may include a symmetrical key used to encrypt the medical content or other sensitive information for transmission, for example from a first site 210 to second site 215. FIG. 3 shows a flow diagram illustrating protecting and transmitting sensitive data by a server or other processing system at a first site. The sensitive data may include medical data containing PHI. The transmission is made between first and second sites in the example embodiment pursuant to an authorized request for the data. The process begins at 302 where sensitive data, such as healthcare data, is received at the first site 210. The processor or processors of the servers at the first site encrypt the sensitive data with a symmetric key at 304. Then the sensitive data is stored in a memory device at the first site 210. In this example, the symmetric key is referred to as a bulk encryption key (BEK). This bulk encryption key is stored in a memory device at the first site at 306.

Proceeding to 306 of the present embodiment, a public key (public KEK) is received from a requesting second site or target site via a network interface device to enable encryption of the sensitive data. At 308, an authorized request for sensitive data, such as data containing PHI, is received via the network interface device, at the first site. Systems and methods of determining authorization may be built in to the software module that regenerates the resilient, site-specific master key. This authentication and authorization will ensure that only user processes with appropriate roles can automatically run the regeneration of the master key. An example authorization or authentication technique includes using MS operating system mandatory access controls, Unix Mandatory Access Control or a similar type of mandatory access control. This may be done by setting up mandatory access control in Unix for example, via SLES Apparmor, SELinux, or another suitable mechanism to control editing the access control privileges to an authorized administrator by the secure access module. An authorized user process is assigned user credentials and membership to a Unix group identification which must be verified before a request of access is granted. It is understood that the public key may be received at the first site before or simultaneously with the authorized request for sensitive data depending on the protocol embodiment used.

At 310, the first site processor or processors encrypt the symmetric key (BEK) with the received public key (public KEK). Then the encrypted symmetric key is stored at 312. Proceeding to 314, the processing system at the first site transmits the encrypted symmetric key (BEK) and the sensitive data to the second site or target site pursuant to the authorized request. Upon receipt, the symmetric key (BEK) may be retrieved from decryption only by use of the private key (private KEK) corresponding to the public key (public KEK) used to encrypt the BEK. The private key is stored securely in a memory device and maintained at the second site. Once the BEK is decrypted by the private key, the second site may decrypt the sensitive data, such as that containing PHI, for use by the authorized requestor. The private key at the second site must be securely maintained to avoid a breach of security around the PHI by an interceptor of the transmitted data. Without the private key (private KEK), the symmetric key (BEK) protecting the PHI is unavailable from the transmission.

Figure 4:
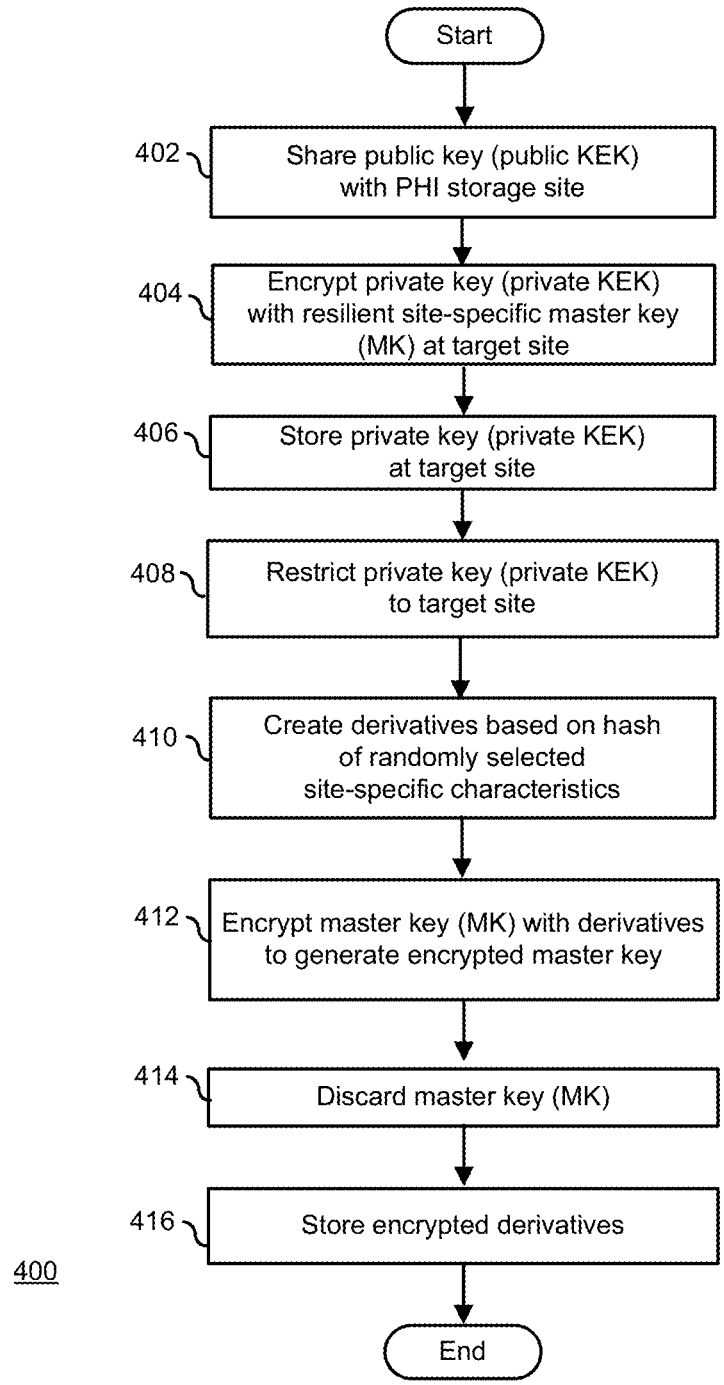
FIG. 4 is a flow diagram illustrating an example encryption method according to an embodiment of the present disclosure.

FIG. 4 shows an embodiment for a system and method 400 of protecting a private key with a resilient site-specific master key and protecting that master key by encrypting it with site-specific derivatives.

Beginning at 402, the processor or processors of the server at the target site transmits to or shares the public key (public KEK) with the storage site via network interface device.

Protection is added in 404 by encrypting the private key (private KEK) with a resilient site-specific master key (MK) in the memory device at the target site. The master key (MK) is a randomly generated number with a sufficient level of entropy or randomness. With sufficiently high entropy, then the probability of the same master key being generated twice, for example across two systems, is very low. For example, in a given stream of bytes, information density may be measured in bits/character. One example of sufficient entropy is a random number with greater than seven bits per character. Fewer bits per character may also be sufficient whereas more bits per character yields a higher level of entropy.

Examples of pseudo-random number generation may be found in several sources. For example, NIST Special Publication 800-90A is a standards paper describing use of Recommended Random Number Generation Using Deterministic Random Bit Generators. A master key random number may be generated using a pseudorandom number generator such as part of a kernel used to generate random numbers for operating system events. One example embodiment uses a hardware volatile entropy gathering and expansion (HAVEGE) algorithm based on processor and system operational variations in connection with external events such as environmental noise collected from device drivers. A further example of this uses a haveged daemon in the linux/dev/random file for generating random numbers. Additional examples of proprietary hardware or software random number generation are also contemplated for use in generating a master key with a cryptographically secure pseudorandom number generator, for example use of Microsoft's CryptGenRandom Cryptographic Application Programming Interface.

Proceeding to 406, the processor or processors store the encrypted private key (private KEK) corresponding to the public KEK in a memory device at the target site. As stated, the private key is very sensitive and must not be discovered to avoid successful decryption of the layered encryption system described in embodiments above. The layered encryption system is meant to protect sensitive data with PHI in one embodiment. At 408, safeguards are placed on the storage of the private KEK at the memory device of the target site in the form of a rule to restrict transmission of the private KEK stored there from the target site.

The flow proceeds to block 410. The mechanism for creating a resilient, site-specific master key creates several derivatives for use in encrypting the master key. As will be discussed below, a large number of site-specific characteristics are selected for the site utilizing the master key. Each derivative is created from a randomly selected site-specific characteristic by applying a hash algorithm to the site-specific identifying characteristic, often a number or series of characters. In an example embodiment, a known hash algorithm may be utilized, such as SHA1 or similar hash function, and applied to the number or series of characters representing the site-specific identifying characteristic selected for a derivative. In another embodiment, multiple hash functions may be applied to the site-specific identifying characteristic, for example a hash of a hash. Over a plurality of derivatives, the order of site-specific characteristics used and the number and sequence of hash functions applied is recorded and encrypted in a buffer memory structure for later access. Additional detail on the generation of site-specific derivatives will be discussed below.

The flow proceeds to 412 where the system for creating a resilient, site-specific master key operating on processors at the site encrypts the master key with the derivatives generated in 410. This generates encrypted master key forms. At 414, the master key is discarded and at 416 the encrypted forms of master key under the derivatives are stored at a memory device. In an embodiment, the encrypted forms of master key are stored at the site servers.

Figure 5:
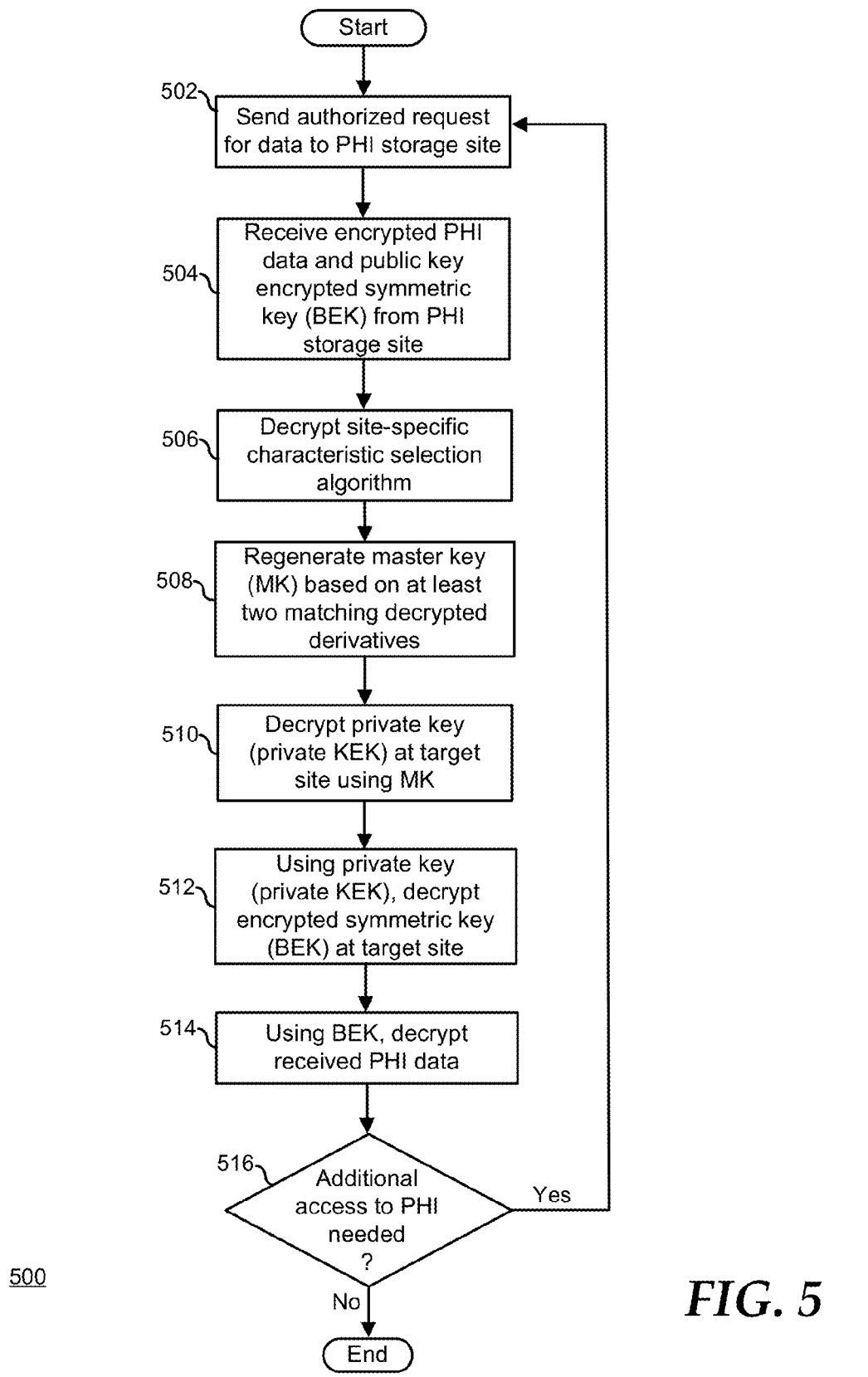
FIG. 5 is a flow diagram illustrating an example sensitive data request and decryption method according to an embodiment of the present disclosure.

FIG. 5 shows a method and system 500 for requesting sensitive data (e.g., medical data containing PHI) by a target site from a storage site, such as a request from the second site 215 to the first site 210 as discussed in the embodiments above for FIG. 2. The flow begins at 502 where the target or requesting site sends an authorized request to the storage site. The request is an authorized request made via authorization techniques such as those discussed above. At some point with the authorized request, the target system must transmit via a network interface device a public key corresponding to the private key stored at the target site. The public key is used by the storage node to encrypt the symmetric key protecting transmitted sensitive data (PHI). Only the private key at the target site can decrypt data encrypted with the public key. The public key may be sent to the storage site specifically for this transaction or disseminated more widely to node sites that communicate with the target node with encrypted data.

Then the flow proceeds to block 504 where the processor operating the system for creating a resilient, site-specific master key at the target site receives encrypted sensitive data via a network interface device. In an embodiment, the encrypted sensitive data received includes the public key encrypted symmetric key (BEK) and the sensitive data from the storage site. To decrypt the symmetric key (BEK) received, the target system accesses the private key stored in a memory device at the target system. In the present embodiment, the site-specific master key must be regenerated.

The flow proceeds to 506 where the site-specific characteristic selection order is decrypted and accessed by the system for regenerating a resilient, site-specific master key. The site-specific characteristics are again selected in order, may be converted to derivatives, and used to decrypt the master key from the several encrypted master key forms. Any two or more matching decrypted keys indicates the master key at 508.

Proceeding to 510, the regenerated master key is used by the processor or processors of the target site to decrypt the private key (private KEK) stored in the memory device. With the private key, the authorized target site can access the symmetric key (BEK) encrypting the sensitive information or PHI at 512. At 514, the BEK may be used to decrypt the PHI data making it available for authorized use at the target system.

Proceeding to decision diamond 516, the processor or processors at the target site determine if an additional access to sensitive data (or PHI) is required. If so, the flow returns to 502 to send an authorized access request to the next storage site holding sensitive data needed at the target site. If no additional PHI access is necessary, the flow ends.

Figure 6:
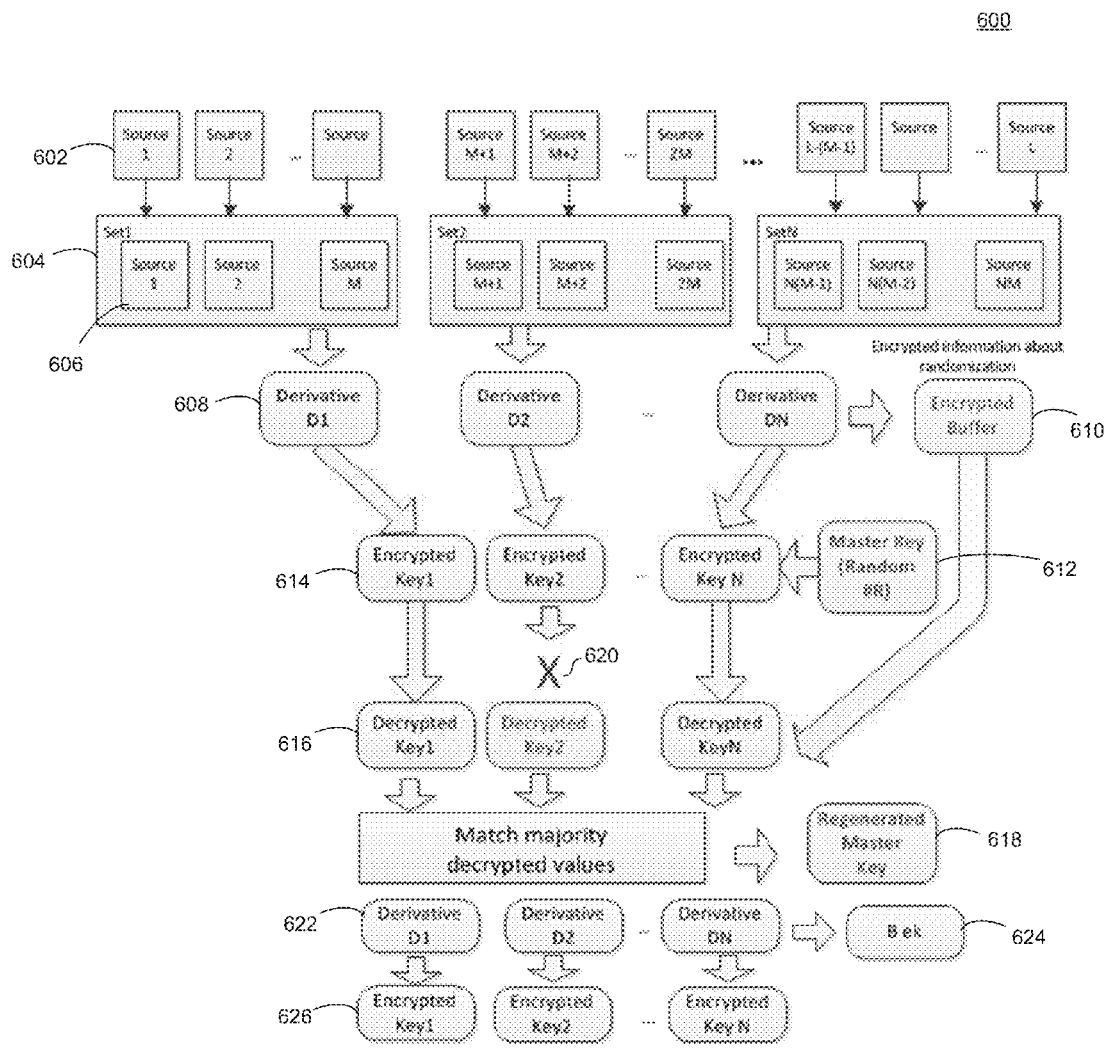
FIG. 6 is a block diagram illustrating an example system for creating a resilient, site-specific master key and regenerating that master key according to an embodiment of the present disclosure.

FIG. 6 shows the operation of system 600 for creating a resilient, site-specific master key operating via code instructions or hardware at a site having need for a master key. In one embodiment, the system begins with a number of site-specific characteristics as sources 602 for creating derivatives for use with the system for creating a resilient, site-specific master key. In the embodiment shown, a large number L of unique characteristics are made available as sources. These site-specific characteristics are unique to the physical site or the software installation at the physical site where the sensitive information must be protected with a master key. This large number reduces the chances of figuring out the site-specific characteristics selected to protect the master key. In this way, breaching the protection of the master key requires in one part knowledge of or access to the numerous physical characteristics of the server system at a site or software installation at the server system.

Examples of site-specific characteristics that may be used as sources 602 are shown below in Table 1.

TABLE 1

| Site-Specific Characteristics | | |
| --- | --- | --- |
| TYPE | DESCRIPTION | EXAMPLE |
| Binary Timestamp | An installation timestamp for various elements of a software installation. For example, a complex systems, such as the DCCA, may have hundreds of installation components as a source. Changed if software is upgraded. | 2010-02-10 14:48 |
| Binary Timestamp with hash. | Similar to above but combined with a hash, typically a one way hash, of sizes of the various elements of a software installation. Changed if software is upgraded. | |
| MAC Address | Media Access Control Address is unique to a network interface device (NIC) for network communications. Changed if NIC is changed. | 00:50:56:94:00:de |
| UUID of the system (System) | Universally unique identifier is a standard used for software construction to identify information | 4214C1BE-F2F0-9340-32F6-BD8997C7753B |

TABLE 1-continued

Site-Specific Characteristics

| TYPE | DESCRIPTION | EXAMPLE |
|---|---|---|
| | source in a distributed computing environment. Changed when the system is replaced. | |
| Serial Number (System) | A system serial number for a motherboard. May be taken from BIOS. Changed when the motherboard or system is replaced. | 42 14 c1 be f2 f0 93 40-32 f6 bd 89 97 c7 75 3b |
| Serial Number (virtual machine) | A serial number taken from a virtual machine hypervisor | 42 14 c1 be f2 f0 93 40-32 f6 bd 89 97 c7 75 3b |
| Processor ID (Processor) | Unique identification number to the processor on the system. Changed if the processor is replaced. | A5 06 00 00 FF FB EB 0F |
| OEM Chassis Information | Unique identification number assigned to the system chassis by an OEM. Changed if the system is replaced. | 0x00001234 |
| OEM Strings | A unique text string in BIOS files related to system locked pre-installation of MS Windows to a motherboard. Changed if the system is changed. | MS_VM_CERT/SHA1/ 27d66596a61c48dd3dc 7216fd715126e33f59ae 7 |

Disjoint sets 604 are created using the site-specific characteristics 606. The plurality of disjoint sets 604 may utilize some similar source site-specific characteristics, but not all disjoint sets 604 have complete overlap. Thus, the disjoint sets 604 are not all subject to a change in a given site-specific characteristic to the physical system or software installation. For example, a system MAC address may be used as a source in some disjoint sets 604, but not all. If a network interface controller (NIC) is changed or replaced during operation of the system to create and regenerate the resilient site-specific master key, it will only affect some disjoint sets 604. Other disjoint sets 604 will not use the MAC address characteristic as a source characteristic. This adds one degree of resiliency to the master key and system for creating and regenerating the resilient, site-specific master key. In this particular example embodiment, N predetermined disjoint sets are created using the L unique site-specific characteristics where each disjoint set contains M site-specific characteristics as sources.

The derivatives 608 are generated by randomly selecting at least one source site-specific characteristic 606 from a respective disjoint set 604 to create a derivative 608 corresponding to the set 604. In an embodiment as shown, N derivatives 608 are shown where one site-specific characteristic 606 is randomly selected from each disjoint set 604. The number of disjoint sets 604 and derivatives 608 correspond in this embodiment. In another embodiment, more than one site-specific characteristic 606 from each disjoint set 604 is selected by the system 600 for each derivative 608. In another embodiment, a disjoint set 604 may source more than one derivative 608 with a site-specific characteristic 606. In yet another embodiment, multiple disjoint sets 604 may source one derivative 608 with a site-specific characteristic 606.

In the embodiment shown in FIG. 6, a hash algorithm may be applied to the selected site-specific characteristic 606 to create each derivative 608. In another embodiment, a hash function or multiple hash functions may be applied in repeated sequences. The selection order of random selection of site-specific characteristics 606 from the disjoint sets 604 to generate the derivatives 608 is preserved and encrypted in a buffer 610 using an embedded fixed key using symmetric key encryption. In an alternative embodiment, the sequence and number of hash functions applied to the site-specific characteristics 606 may also be recorded and preserved in encrypted buffer 610 for later use in regenerating a master key. The predetermined disjoint sets must be stored and preserved as well in a memory structure at the site utilizing the system 600 for creating a resilient, site-specific master key.

A random number generator or pseudo-random number generator is used to generate random number (R) as a master key 612. The master key is encrypted using the derivatives 608 to generate encrypted master key forms 614, also referred to as encrypted keys (1-N). The system 600 for creating a resilient, site-specific master key stores the encrypted master keys 614 and discards the master key 612.

Upon decryption of the encrypted buffer 610, the embedded fixed key may be used to access the random selection order of site-specific characteristics 606 and hash algorithm application. Using this random selection order and the disjoint sets 604, the derivatives 608 may be regenerated. The encrypted master key 614 may be decrypted using the regenerated derivatives 608 to create decrypted keys 616. Any two or more matching decrypted keys 616 indicate the regenerated master key 618. If a site-specific characteristic changes 620 in the meantime before regeneration of the master key, it will not affect the resiliency of the master key protection because a plurality of site-specific characteristics 606 have been used to generate derivatives 608. The chances of all site-specific characteristics 606 being changed during maintenance, upgrades, et cetera is low. Additionally, the chances that two random numbers (R) result from decryption error to indicate a false master key is also low due to inherent diversity in the sources of derivatives. A system attempting to access the master key but not having the correct site-specific characteristics will be unable to regenerate the master key and access sensitive information such as the private key.

Example changes that could affect some encrypted master key forms 614, but not all encrypted master key forms, include the MAC address change described above, a change to a motherboard or processor used in at the site, an upgrade to the software installation changing the timestamp or checksum, or a change to a virtual address location such as the VMware Serial number, among others. With such a change occurring, the system 600 for creating a resilient, site-specific master key may replace the changed site-specific characteristics 606 with a current value in the disjoint sets 604 and regenerate the site-specific derivatives 622. The updated site-specific derivatives 622 may be used to encrypt the regenerated master key 618 once again. The random selection order may be once again buffer encrypted 624, and the encrypted master key forms 626 stored again for later use to access the master key. In an alternative embodiment, if one decrypted key 616 does not match, all derivative values may be regenerated with new site-specific characteristics used as sources 606 from the disjoint sets 604. Then the generation of new derivatives 622 and encrypted master key forms 626 may proceed as described.

Use of the above system of FIG. 6 avoids the pitfalls of other options of protecting sensitive information such as a private key. For example, storage of a random generated master key in a cloud based trustee solution requires reliance on a third party and is subject to accessibility and security issues with the internet. Use of a hardware security module (HSM) in the site server system is an added cost. Moreover, an HSM requires an integration effort within the site server system and may call for required changes to accommodate the HSM hardware. The system and method for creating a site-specific master key described in the embodiments of FIG. 6 and elsewhere herein are automatic for storage and retrieval of the unique master key and do not require human intervention. The systems and methods of the embodiments herein exploit a combination of uniqueness to the physical site, virtual site, software installation or a combination of the same. These characteristics inherently have a general invariance, at least as to the plurality of site-specific characteristics used. The described system and methods are resilient to changes in some of the physical, virtual or software characteristics by permitting regeneration of the master key even if some change occurs. Further, the system and method for creating a site-specific master key provide security in two ways: the developer who built the pseudorandom number generator used to generate the master key may know the methodology, but will not have access to the site-specific characteristics; and those with access to the site-specific characteristics, in turn, likely do not have the details of the master key generation technique.

Figure 7:
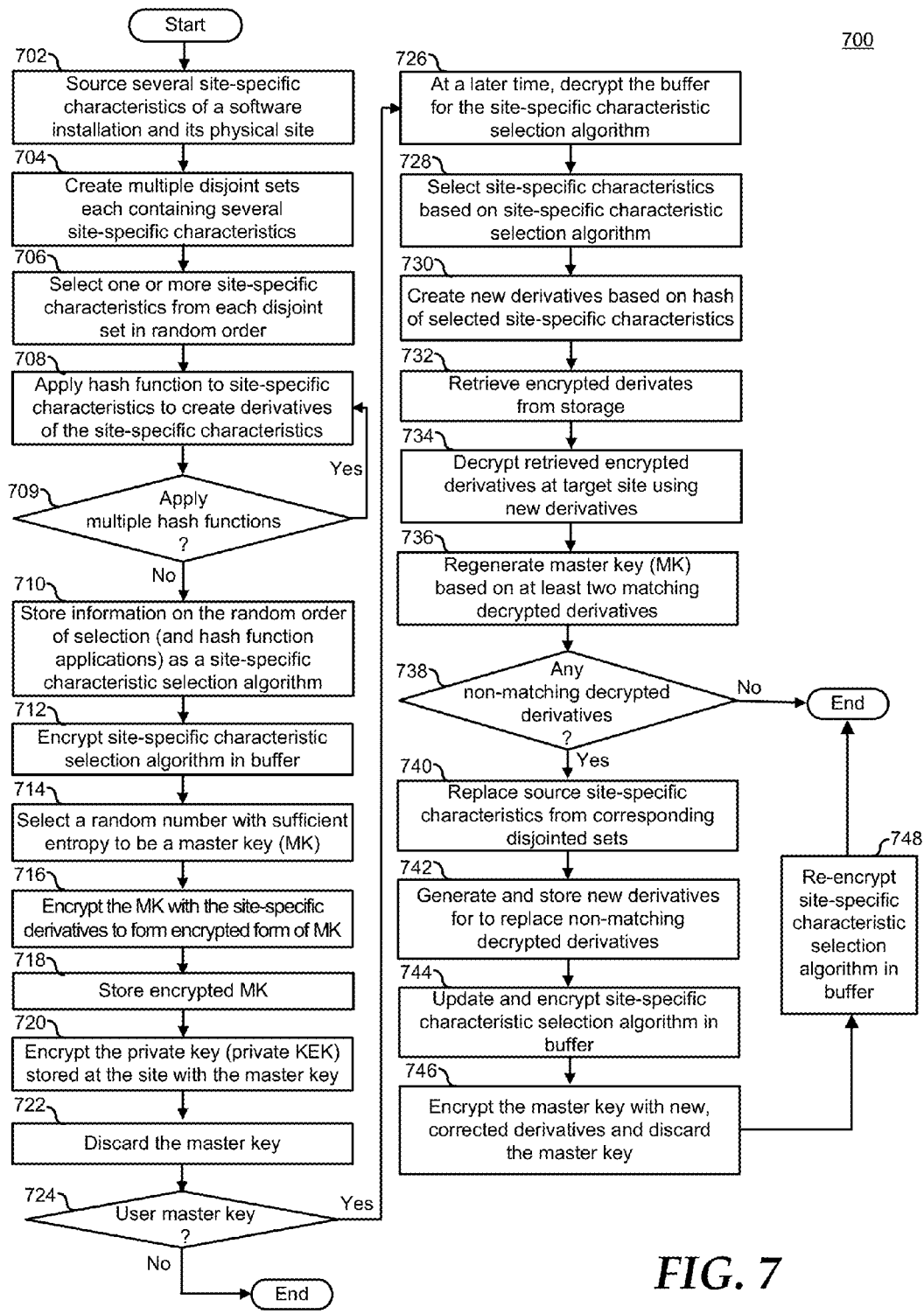
FIG. 7 is a flow diagram illustrating another example system for creating a resilient, site-specific master key and regenerating that master key according to an embodiment of the present disclosure.

FIG. 7 shows a flow chart illustrating an embodiment of the method and system 700 for creating a resilient, site-specific master key similar to that shown in FIG. 6. The flow begins at 702, wherein the processor or processors at a site utilizing the site-specific master key determines several site-specific characteristics. Site-specific characteristics include software component installation characteristics and physical site characteristics. These site-specific characteristics often are a string of numbers, characters, or both identifying several factors related to a physical site, virtual site, or software installation. Several examples are discussed in more detail above and shown in Table 1. These site-specific characteristics serve as a source of physical characteristics used to create site specific derivatives.

Proceeding to 704, the system and method for creating the site-specific master key creates a set of multiple, predetermined disjoint sets of source site-specific characteristics. In one embodiment, a disjoint set of several site-specific characteristics is created for each of the plurality of site-specific derivatives to be generated. In another embodiment, two or more disjoint sets may be used as a source to create a site-specific derivative. In yet another alternative embodiment, each disjoint set may be used to create multiple site-specific derivatives. Any combination of disjoint sets and site-specific derivatives is contemplated.

At 706 of the presently described embodiment, one or more site-specific characteristics from each disjoint set are randomly selected for a site-specific derivative. This is repeated for several site-specific derivatives. The order of random selection of site-specific characteristics from disjoint sets is recorded during the creation of the plurality of derivatives.

In one embodiment, the flow proceeds to 708 where a hash function is applied to each selected site-specific characteristic to generate each derivative. Known hash functions may be used such as SHA1, SHA2, MD5, checksums and other hash functions. A plurality of derivatives are generated at 708. Application of the hash function permits further encoding of the data and also may generate a uniform result for each site-specific derivative. In other words, the strings of characters and numbers for each site-specific characteristic may be of unique length and include numerous character-types. Application of a hash may generate a string of number (or characters) of uniform length which has advantages in utilization by the system upon decryption after storage. Additionally, multiple site-specific derivatives of uniform length and hashing functions further add to the security protection.

The flow proceeds to decision block 709 in one embodiment where the processor or processors determine whether the instructions require application of multiple hash functions to each selected site-specific derivatives. This hash-within-a-hash feature is an alternative embodiment of the present disclosure. It may include utilizing the same hashing algorithm two times in a row in an embodiment. In another embodiment, the system and method may utilize different hashing algorithms in a sequence. The hashing algorithm application may be recorded for later reconstruction of the site-specific derivatives. If the application of multiple hash functions is called for, the system returns to 708 to apply another hash function. If not, the system and method flow proceeds to 710. In an alternative embodiment, sequenced hash functions may alter the length of a site-specific characteristic in some ways such that each derivative may be of different length which may add to unpredictability of the system.

At 710, the random order of selection of site-specific characteristics from the disjoint sets that was recorded is stored in a memory device. In one embodiment, where multiple hash function applications are used, the number of hash applications and the sequence may also be stored in the memory device separately or together with the site-specific characteristic selection order.

In one embodiment, these algorithms for randomly selecting characteristics and for applying hash functions is stored and encrypted in a buffer memory at the site utilizing symmetric bulk encryption key. The flow proceeds to 712 where the system and method for creating the site-specific master key encrypts the site-specific characteristics selection order in the buffer. In another embodiment, the hash function application sequences are also encrypted in the buffer. In the specific embodiment described herein, a symmetric encryption is used to encrypt the buffer. Tight access controls are placed on this symmetric encryption key protecting the random site-specific characteristic selection order stored in a buffer memory by limiting access only to authorized personnel. This symmetric key may embedded in code via code obfuscation to limit access to the key. Thus access to this symmetric key for protecting the random site-specific characteristic selection order is limited to an authorized user or system on a very limited basis.

Proceeding to 714, a random number is selected with sufficient entropy to serve as the master key. Random number generators or pseudorandom number generators as described above may be used by the processor or processors executing instructions to run the system and method for creating site-specific master key.

At 716, the system for creating a site-specific master key encrypts the master key random number in each of the site-specific derivatives generated at 708. A plurality of encrypted master key forms are generated at 716. Proceeding to 718, the encrypted master key forms are stored at a memory device at the physical site or virtual site utilizing the master key system.

Proceeding to 720, the master key random number is used to encrypt sensitive information on the physical site. In an example embodiment, the private key utilized by the site to receive sensitive data such as PHI is encrypted with the master key. After encryption of the private key or other sensitive information, the master key is discarded at 722. The information to automatically regenerate the master key upon an authorized need to use it is stored with the encrypted master key forms and the encrypted site-characteristic selection order (and hash algorithm sequence).

The system for creating a resilient site-specific master key may also be called upon to regenerate the master key for access to the information it protects such as the private key of 720. At decision diamond 724, the processor or processors determine if a request has been received by the system site to automatically generate the site-specific master key. If not, the flow ends until such a request is received.

If a request to regenerate the site-specific master key is received by the system, the flow proceeds to 726. At 726, the buffer is decrypted to yield the site-specific characteristic selection order. A tightly controlled symmetric key may be accessed with authorization to decrypt the buffer. In one embodiment, the hash application sequence is also decrypted and accessed. The encrypted hash application sequence will use a key embedded in the decryption in obfuscated form.

Based on the site-specific selection order decrypted from the buffer memory, the processors execute instructions to re-select those physical, virtual and software characteristics again at 728. The hash function, if it is a known algorithm, is re-applied to these site-specific characteristics to re-create the site-specific derivatives at 730. In an alternate embodiment, the hash function application sequence is applied according to the decrypted sequence from the buffer memory.

The flow proceeds to 732 where the system retrieves the encrypted master key forms from the memory device. The re-created site-specific derivatives generated at 730 are used to decrypt the encrypted master key forms at 734. Decrypting the encrypted master key forms with the re-created derivatives yields multiple decrypted keys. Those decrypted keys may be the resilient, site-specific master key. At 736, the processor or processors executing the system for creating a site-specific master key compare the decrypted keys generated at 734. Any two or more decrypted keys that match indicates the regenerated master key which can be used to decrypt the data protected with the private key. In this embodiment, the private key may be decrypted with the master key. As described above, if a physical, virtual, or software site-specific characteristic changed while the encrypted master key forms were stored, the decrypted key from that encrypted master key form will not match the others and that encrypted master key form no longer can generate the master key. The plurality of encrypted master key forms therefore lends substantial resilience to the system. One or more physical, virtual, or software site characteristics may be changed, but the master key may still be securely regenerated.

At decision diamond 738, the processor or processors executing the system and method for creating the resilient, site-specific master key determines whether any decrypted keys at 734 are non-matching with the master key. If all match, the site-specific selection order (and hash function application sequence) in the buffer memory may be re-used. The master key may be used to re-encrypt the private key and be discarded whereby the process ends.

If some encrypted master key forms do not match the master key upon decryption, the flow proceeds to 740. For each encrypted master key form having a non-matching decrypted key at 734, the system and method may replace the site-specific characteristic chosen for that derivative with an updated site-specific characteristic in the disjoint set, or another site-specific characteristic from the disjoint set may be randomly selected. If the site-specific characteristic selection order from the disjoint sets is altered, the new site-specific characteristic selection order is recorded.

At 742, the system and method for creating a site-specific master key generates the new, corrected derivatives by replacing non-matching derivatives. At 744, any altered site-specific characteristic selection order is updated in the buffer memory and encrypted there to enable later master key regeneration at the site. The regenerated master key is encrypted with the new, corrected derivatives and the master key is discarded at 746. The site-specific selection order (and hash function application sequence) may be re-encrypted in the buffer memory at 748. The corrected, encrypted master key forms are stored in a memory device at the site using the master key system (not shown). At this point, the flow may end until the master key is needed again.

In one alternative embodiment, if any derivatives yield non-matching results at 738, an entirely new set of derivatives may be created at 742-748 with an entirely new site-specific characteristic selection order and newly selected characteristics from the disjoint sets. Creating an entirely new set of derivatives would be in place of simply correcting or replacing non-matching derivatives as described in FIG. 7.

Figure 8:
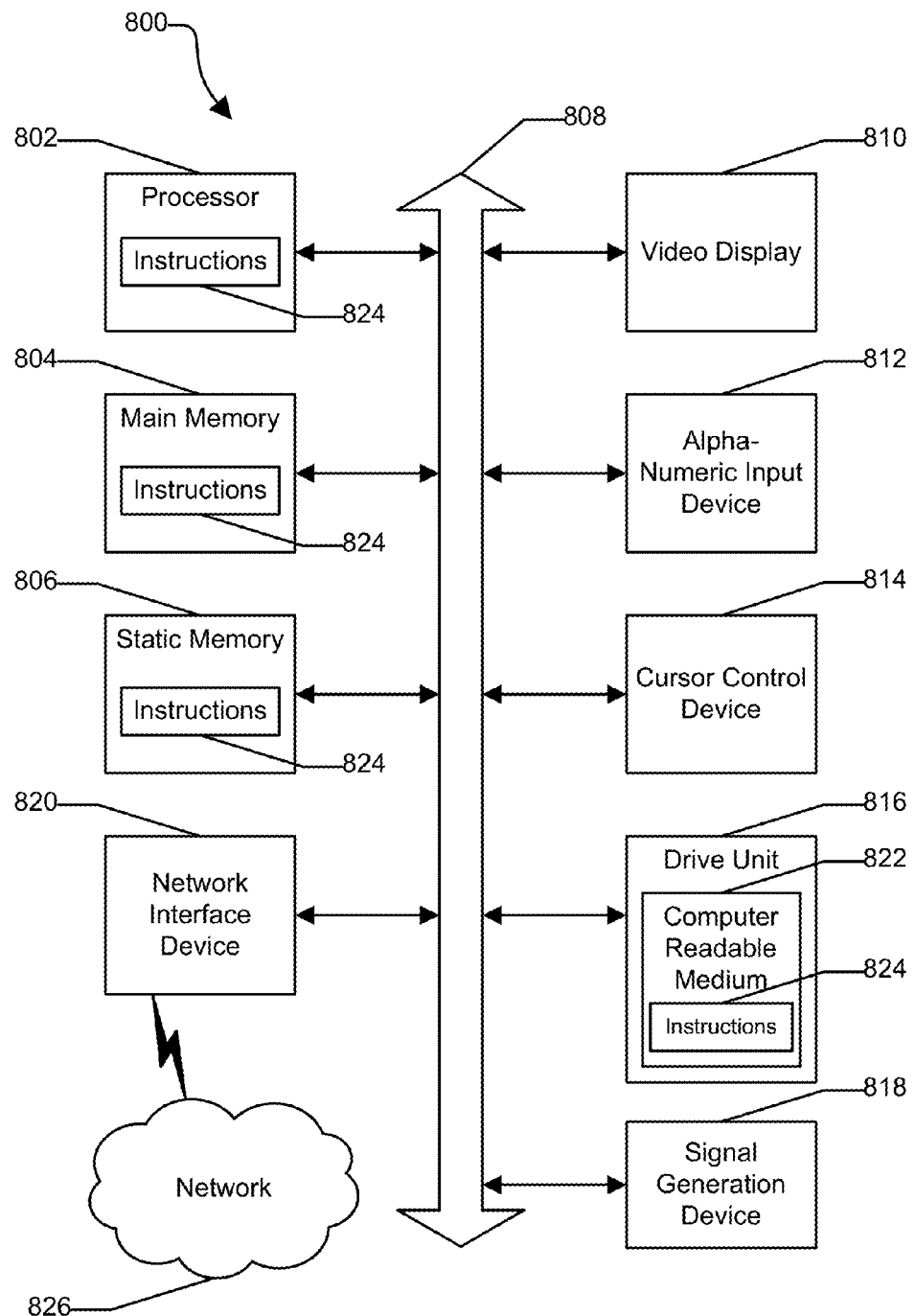
FIG. 8 is a block diagram illustrating an information handling system according to an embodiment of the present disclosure.

FIG. 8 shows an information handling system 800 capable of administering each of the specific embodiments of the present disclosure. The information handling system 800 can represent the user device 20, the systems 30, 60, 70, and 80 of FIG. 1, including the clinical archive 30 in the enterprise healthcare system, the target site system executing requests for healthcare information, cloud clinical archives, or another data processing device associated with the healthcare network system 10 for resilient, site specific protection of transmission or access to clinical healthcare data or other types of sensitive data. The information handling system 800 may include a processor 802 such as a central processing unit (CPU), a graphics processing unit (GPU), or both. Moreover, the information handling system 800 can include a main memory 804 and a static memory 806 that can communicate with each other via a bus 808. As shown, the information handling system 800 may further include a video display unit 810, such as a liquid crystal display (LCD), an organic light emitting diode (OLED), a flat panel display, a solid state display, or a cathode ray tube (CRT). Additionally, the information handling system 800 may include an input device 812, such as a keyboard, and a cursor control device 814, such as a mouse. The information handling system 800 can also include a disk drive unit 816, a signal generation device 818, such as a speaker or remote control, and a network interface device 820. The information handling system 800 can represent a server device whose resources can be shared by multiple client devices, or it can represent an individual client device, such as a desktop personal computer.

The information handling system 800 can include a set of instructions that can be executed to cause the computer system to perform any one or more of the methods or computer based functions disclosed herein. The computer system 800 may operate as a standalone device or may be connected such as using a network, to other computer systems or peripheral devices.

In a networked deployment, the information handling system 800 may operate in the capacity of a server or as a client user computer in a server-client user network environment, or as a peer computer system in a peer-to-peer (or distributed) network environment. The information handling system 800 can also be implemented as or incorporated into various devices, such as a personal computer (PC), a tablet PC, a set-top box (STB), a PDA, a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 800 can be implemented using electronic devices that provide voice, video or data communication. Further, while a single information handling system 800 is illustrated, the term "system" shall also be taken to include any collection of systems or sub-systems that individually or jointly execute a set, or multiple sets, of instructions to perform one or more computer functions.

The disk drive unit 816 may include a computer-readable medium 822 in which one or more sets of instructions 824 such as software can be embedded. The disk drive unit 816 also contains space for data storage. Further, the instructions 824 may embody one or more of the methods or logic as described herein. In a particular embodiment, the instructions 824 may reside completely, or at least partially, within the main memory 804, the static memory 806, and/or within the processor 802 during execution by the information handling system 800. The main memory 804 and the processor 802 also may include computer-readable media. The network interface device 820 can provide connectivity to a network 826, e.g., a wide area network (WAN), a local area network (LAN), or other network.

In an alternative embodiment, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 824 or receives and executes instructions 824 responsive to a propagated signal; so that a device connected to a network 828 can communicate voice, video or data over the network 828. Further, the instructions 824 may be transmitted or received over the network 828 via the network interface device 820.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. An information handling system comprising:
   a storage device for storing a protected private key at a site location;
   a processor adapted to determine a plurality of derivatives by randomly selecting an order of site characteristics from a plurality of disjoint sets of site characteristics unique to a software installation or site location;
   the processor applying a hash algorithm to each selected site characteristic;
   a buffer storage device for storing an order of random selection of the site characteristics for the plurality of derivatives;
   the processor encrypting the stored random selection order with a first symmetric encryption key and embedding the first symmetric encryption key in code;
   the processor generating a site specific master key for encrypting the protected private key;
   the processor encrypting the site specific master key with each of the plurality of derivatives to form a plurality of encrypted master key forms corresponding to the plurality of derivatives;

the processor storing the plurality of encrypted master key forms on the storage device at the site location;

the processor discarding the site specific master key in response to storing the plurality of encrypted master key forms.

2. The system of claim 1, wherein the processor applies an obfuscation transform to the first symmetric encryption key prior to embedding the first symmetric encryption key in code.

3. The system of claim 1, wherein in response to an authorized access attempt to stored sensitive data at a site location, the processor decrypts each of the plurality of encrypted master key forms with the plurality of derivatives newly-generated with the stored random selection order and compares decrypted master key forms, and wherein any two or more matching decrypted master key forms yields a correct regenerated site specific master key.

4. The method of claim 1, further comprising:

decrypting the protected private key stored at the site location with a regenerated site specific master key;

decrypting a second symmetric encryption key stored at the site location with the decrypted private key to permit access to sensitive data.

5. The method of claim 4, wherein the sensitive data is health-care related data with limitations placed on transmission of the sensitive data from the site location in cleartext.

6. The method of claim 3, further comprising:

discarding decrypted site characteristic derivative forms not matching the regenerated site specific master key; and replacing the derivatives corresponding to the discarded site characteristic derivative forms with newly generated derivatives to form a corrected plurality of derivatives.

7. The method of claim 1, wherein the site characteristics include a plurality of site hardware characteristics comprising a processor identification number.

8. A computer-implemented method of creating a resilient, site specific master-key, comprising:

creating, via a processor executing instructions at a site location, a plurality of disjoint sets each having a plurality of site characteristics unique to a software installation or site location;

determining, via the processor, a plurality of derivatives for each disjoint set by randomly selecting a site characteristic for each disjoint set;

storing the order of random selection of the site characteristics for the plurality of disjoint sets in a buffer storage device;

encrypting the stored random selection order with a symmetric encryption key and embedding the symmetric encryption key in code;

generating a site specific master key and encrypting the site specific master key with each of the plurality of derivatives to form a plurality of encrypted master key forms corresponding to the plurality of derivatives;

storing the plurality of encrypted master key forms on a storage device at the site location; and discarding the site specific master key in response to encrypting the site specific master key with each of the plurality of derivatives to form a plurality of encrypted master key forms.

9. The method of claim 8, further comprising:

applying an obfuscation transform to the first symmetric encryption key prior to embedding the first symmetric encryption key in code.

10. The method of claim 8, further comprising:

decrypting each of the plurality of encrypted master key forms, wherein any two matching decrypted master key forms yields the correct regenerated site specific master key.

11. The method of claim 10, further comprising:

discarding decrypted site characteristic derivative forms not matching the regenerated site specific master key; and replacing the derivatives corresponding to discarded site characteristic derivative forms with newly generated derivatives to form a corrected plurality of derivatives.

12. The method of claim 11, further comprising:

encrypting the stored random selection order for the corrected plurality of derivatives with the embedded symmetric encryption key.

13. The method of claim 9, further comprising:

discarding all decrypted site characteristic derivative forms when any decrypted site characteristic derivative form does not match the regenerated site specific master key; and replacing all the derivatives with newly generated derivatives.

14. The method of claim 8, wherein the site characteristics include a plurality of software installation characteristics comprising a binary code checksum and copying timestamp.

15. The method of claim 8, wherein the site characteristics include a plurality of site hardware characteristics comprising a MAC address.

16. A computer-implemented method of regenerating a site specific master key to access encrypted private key data comprising:

decrypting, via a processor executing instructions at a site location, an order of selection of site characteristics from a plurality of disjointed sets of site characteristics unique to a software installation or site location from a buffer storage device with a first symmetric encryption key;

regenerating, via the processor, a plurality of derivatives according to the decrypted order of selection of site characteristics decrypted from the buffer storage device;

retrieving a plurality of encrypted site characteristic derivative forms from a storage device;

decrypting the plurality of encrypted master key forms with the plurality of derivatives;

determining a regenerated site specific master key by matching any two decrypted master key forms wherein a match yields the correct regenerated site specific master key;

decrypting protected private key data with the regenerated site specific master key; and decrypting a second symmetric encryption key received at the second site location along with encrypted healthcare data using the decrypted private key data; and decrypting the healthcare data using the decrypted second symmetric encryption key.

17. The method of claim 16, wherein the site characteristics include a plurality of software installation characteristics comprising a binary code checksum and copying timestamp.

18. The method of claim 17, wherein the site characteristics include a binary timestamp.

19. The method of claim 16, further comprising:

re-encrypting the private key using the regenerated, site specific master key;

encrypting each of the plurality of derivatives with the regenerated site specific master key to form a plurality of encrypted site characteristic derivative forms; and discarding the regenerated master key.

20. The method of claim 16, further comprising:
  authenticating a user seeking to regenerate the site specific master key based on user credentials and membership to a unix group identification.

* * * * *